United States Patent Office 2,696,488
Patented Dec. 7, 1954

2,696,488

2,4,6-TRIS-(1-PIPERIDYL)-5-BENZYLPYRIMIDINE AND PROCESS OF PREPARING SAME

Floyd E. Anderson, Yonkers, N. Y.

No Drawing. Application February 16, 1954,
Serial No. 410,708

4 Claims. (Cl. 260—256.4)

This invention relates to a novel pyrimidine compound having marked central nervous system activity and useful as a sedative for oral administration.

The novel compound of my invention comprises a 5-benzylpyrimidine compound substituted in each of the 2-, 4- and 6-positions by a piperidine group and having the following structural formula

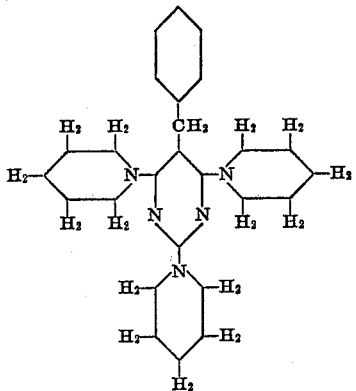

This compound may be obtained by reacting a 2,4,6-trihalo-5-benzylpyrimidine with piperidine, preferably under pressure and at a temperature of 140° to 150° C. for 48 to 60 hours. Both the chlor- and brom-substituted pyrimidine intermediate may be employed. The tripiperidino-substituted pyrimidine crystallizes readily and also forms crystalline salts such as the hydrochloride, for example. The melting points given are uncorrected.

In order further to illustrate my invention but without being limited thereto, the following examples are given:

*Example I*

5 parts by weight of 2,4,6-trichloro-5-benzylpyrimidine are placed in a pressure vessel along with 23 parts by weight of piperidine and 8.3 parts by weight of phenol. The reaction mixture is heated under autogenous pressure at 150° C. for 48 hours. The contents of the reaction vessel are poured slowly onto a mixture of ice and water. The aqueous solution is strongly acidified with hydrochloric acid and extracted with ether to remove the phenol. The aqueous acid solution is rendered alkaline by the addition of aqueous sodium hydroxide, and the separated organic base is extracted with diethyl ether. Upon distillation of the ether, the desired product separates as a residue. After recrystallization from acetone and then from isopropanol, there are obtained three parts by weight of 2,4,6 - tris - (1 - piperidyl) - 5 - benzylpyrimidine, M. P. 129–131° C.

A monohydrochloride of this tribasic compound is prepared by the addition of one equivalent of standardized ethereal hydrogen chloride to an ether solution of the base. M. P. 205–207° C.

Calculated for $C_{26}H_{37}N_5 \cdot HCl$: 7.76% Cl. Found: 7.67% Cl.

*Example II*

5 parts by weight of 5-benzyl barbituric acid and 50 parts by weight of phosphorus oxybromide are heated together at 150 to 170° C. for 20 hours. The cooled reaction mixture is poured slowly into an ice-ether mixture with constant stirring. When the ice melts, the ether layer is separated and the aqueous layer extracted several times with diethyl ether. The combined, dried ether extracts are distilled. After recrystallization of the yellow, crude residue obtained from an acetone-water mixture and twice from methyl-alcohol, the 2,4,6-tribromo-5-benzylpyrimidine is obtained in purified form. M. P. 105° C. Nitrogen analysis (Dumas) gives the following:

Calculated for $C_{11}H_7N_2Br_3$: 6.88% N. Found: 6.83% N.

Bromine analysis yields the following:
Calculated for $C_{11}H_7N_2Br_3$: 58.91% Br. Found: 57.1% Br.

*Example III*

4 parts by weight of 2,4,6-tribromo-5-benzylpyrimidine and 20 parts by weight of freshly distilled piperidine are sealed in a pressure tube and heated at 100 to 110° C. for 48 hours. The temperature is then raised to 160° C. and is maintained for an additional 24 hours. The reaction mixture obtained is treated with about 100 parts by weight of aqueous 10% sodium carbonate. Combined ether extracts from a four-fold extraction of the reaction mixture are evaporated to yield a crude, yellowish product. After recrystallization from acetone and then from isopropyl alcohol, 2.2 parts by weight of 2,4,6-tris-(1-piperidyl)-5-benzylpyrimidine are obtained, M. P. 129–130° C. A nitrogen analysis (Dumas) is the following:

Calculated for $C_{26}H_{37}N_5$: 16.7% N. Found: 17.2% N.

It is understood that the foregoing detailed description is given merely by way of illustration and that many variations may be made therein without departing from the spirit of my invention.

Having described my invention, what I desire to secure by Letters Patent is:

1. 2,4,6 - tris - (1 - piperidyl) - 5 - benzylpyrimidine and the water-soluble, non-toxic salts thereof.
2. Process for the preparation of 2,4,6-tris-(1-piperidyl)-5-benzylpyrimidine which comprises reacting a 2,4,6-trihalo-5-benzylpyrimidine with piperidine.
3. Process for the preparation of 2,4,6-tris-(1-piperidyl)-5-benzylpyrimidine which comprises reacting a 2,4,6-trichloro-5-benzylpyrimidine with piperidine.
4. Process for the preparation of 2,4,6-tris-(1-piperidyl)-5-benzylpyrimidine which comprises reacting a 2,4,6-tribromo-5-benzylpyrimidine with piperidine.

No references cited.